(12) United States Patent
Manuel Grases et al.

(10) Patent No.: US 11,485,074 B2
(45) Date of Patent: *Nov. 1, 2022

(54) SUPPLYING BUILD MATERIAL

(71) Applicant: HEWLETT-PACKARD DEVELOPMENT COMPANY, L.P., Spring, TX (US)

(72) Inventors: Jose Manuel Grases, Sant Cugat del Valles (ES); Pau Martin Vidal, Sant Cugat del Valles (ES); Fernando Juan, Sant Cugat del Valles (ES); Pablo Dominguez Pastor, Sant Cugat del Valles (ES); Gerard Mosquera, Sant Cugat del Valles (ES)

(73) Assignee: Hewlett-Packard Development Company, L.P., Spring, TX (US)

( * ) Notice: Subject to any disclaimer, the term of this patent is extended or adjusted under 35 U.S.C. 154(b) by 141 days.

This patent is subject to a terminal disclaimer.

(21) Appl. No.: 16/690,378

(22) Filed: Nov. 21, 2019

(65) Prior Publication Data
US 2020/0086575 A1    Mar. 19, 2020

Related U.S. Application Data

(63) Continuation of application No. 15/745,612, filed as application No. PCT/EP2015/077321 on Nov. 23, 2015, now Pat. No. 10,596,760.

(51) Int. Cl.
*B29C 64/153* (2017.01)
*B29C 64/205* (2017.01)
(Continued)

(52) U.S. Cl.
CPC .......... *B29C 64/153* (2017.08); *B29C 64/205* (2017.08); *B29C 64/218* (2017.08);
(Continued)

(58) Field of Classification Search
CPC ... B29C 64/153; B29C 64/205; B29C 64/329; B29C 64/393; B29C 64/218; B33Y 10/00; B33Y 40/00; B33Y 50/02; B33Y 30/00
See application file for complete search history.

(56) References Cited

U.S. PATENT DOCUMENTS

| 7,731,887 B2 | 6/2010 | Hull |
| 8,568,124 B2 | 10/2013 | Brunermer |

(Continued)

FOREIGN PATENT DOCUMENTS

| CN | 101090787 | 12/2007 |
| CN | 101553356 | 10/2009 |

(Continued)

OTHER PUBLICATIONS

Wang; "Cost-effective Printing of 3D Objects with Skin-Frame Structures"; Nov. 2013; <http://dl.acm.org/citation.cfm?id=2508382>.

*Primary Examiner* — Michael N Orlando
*Assistant Examiner* — Christopher W Raimund
(74) *Attorney, Agent, or Firm* — HP Inc. Patent Department

(57) ABSTRACT

According to one example there is provided an apparatus for supplying build material to a three-dimensional printing system. The apparatus comprises a rotatable vane.

19 Claims, 5 Drawing Sheets

(51) Int. Cl.
  *B29C 64/329* (2017.01)
  *B29C 64/393* (2017.01)
  *B29C 64/218* (2017.01)
  *B33Y 30/00* (2015.01)
  *B33Y 10/00* (2015.01)
  *B33Y 40/00* (2020.01)
  *B33Y 50/02* (2015.01)

(52) U.S. Cl.
  CPC .......... *B29C 64/329* (2017.08); *B29C 64/393* (2017.08); *B33Y 10/00* (2014.12); *B33Y 30/00* (2014.12); *B33Y 40/00* (2014.12); *B33Y 50/02* (2014.12)

(56) References Cited

U.S. PATENT DOCUMENTS

| | | |
|---|---|---|
| 8,888,480 B2 | 11/2014 | Yoo |
| 9,002,496 B2 | 4/2015 | Elsey |
| 10,596,760 B2 * | 3/2020 | Manuel Grases ..... B29C 64/329 |
| 2007/0298182 A1 | 12/2007 | Perret |
| 2008/0128956 A1 | 6/2008 | Perret |
| 2010/0151136 A1 | 6/2010 | Davidson |
| 2011/0109016 A1 | 5/2011 | Fuwa |
| 2014/0203479 A1 | 7/2014 | Teken |

FOREIGN PATENT DOCUMENTS

| | | |
|---|---|---|
| CN | 102015258 A | 4/2011 |
| CN | 104837607 A | 8/2015 |
| WO | WO-2014044676 | 3/2014 |
| WO | WO-2017005301 | 1/2017 |

\* cited by examiner

SUPPLYING BUILD MATERIAL

BACKGROUND

Additive manufacturing techniques, such as three-dimensional (3D) printing, enable objects to be generated on a layer-by-layer basis. 3D printing techniques may generate layers of an object by forming successive layers of a build material on a build or build platform, and selectively solidifying portions of each layer of the build material.

BRIEF DESCRIPTION

Examples will now be described, by way of non-limiting example only, with reference to the accompanying drawings, in which.

DETAILED DESCRIPTION

Some 3D printing systems use build material that have a powdered, or granular, form. According to one example a suitable build material may be a powdered semi-crystalline thermoplastic material. One suitable material may be Nylon 12, which is available, for example, from Sigma-Aldrich Co. LLC. Another suitable material may be PA 2200 which is available from Electro Optical Systems EOS GmbH.

In other examples other suitable build materials may be used. Such materials may include, for example, powdered metal materials, powdered plastics materials, powdered composite materials, powdered ceramic materials, powdered glass materials, powdered resin material, powdered polymer materials, and the like. Different powders may have different characteristics, such as different average particle sizes, different minimum and maximum particle sizes, different coefficient of friction, different angle of repose, and the like. In some examples non-powdered build materials may be used, such as gels, pastes, and slurries.

Such 3D printing systems typically provide, along a side of a build platform, a quantity of build material to be spread over the build platform to form a thin layer of build material on the build platform. Portions of the layer may then be solidified, using any suitable solidification technique, such as fusing agent deposition and heating systems, binder agent deposition systems, laser sintering systems, and the like.

During a 3D printing operation, an initial layer of build material may be spread directly on the surface of a build platform, whereas subsequent layers of build material may be formed on a previously formed layer of build material. Herein, reference to forming a layer of build material on the build platform may refer, depending on the context, either to forming a layer of build material directly on the surface of the build platform, or to forming a layer of build material on a previously formed layer of build material.

Various examples will now be described that provide a compact and convenient system for providing build material to be spread over a build platform, for example for use in the generation of 3D objects by a 3D printing system. Examples described herein enable a dose of a predetermined quantity of build material to be formed along the edge of a build platform. The dose of build material may then be spread over the build, or support, platform using an appropriate build material spreading mechanism. Forming a dose of build material may be useful, for example, for reducing the amount of excess build material remaining after a layer of build material has been formed, for ensuring that sufficient build material is provided to enable a complete layer of build material to be formed, and for reducing the amount of build material that could become airborne whilst forming a layer of build material.

Figure 1:
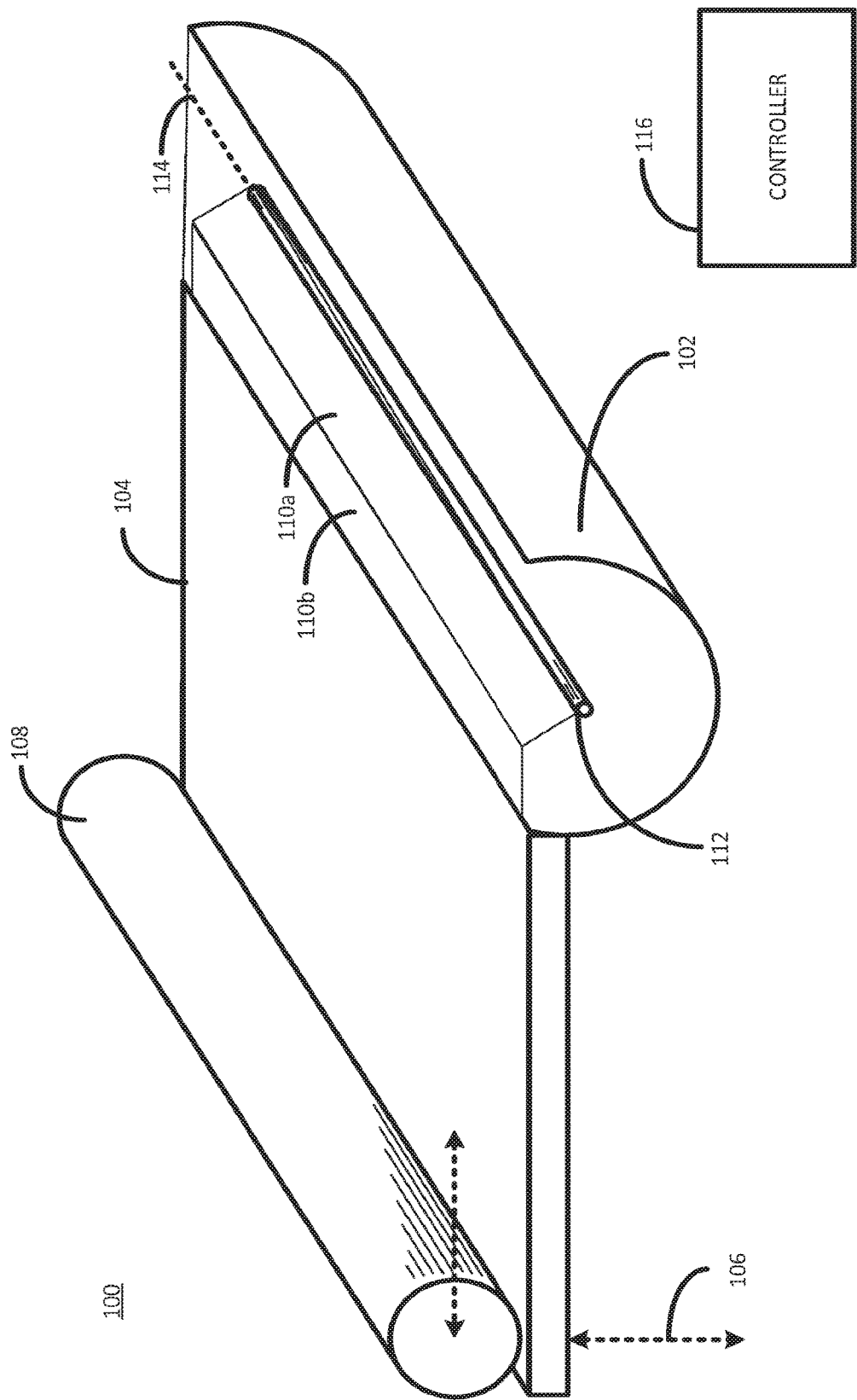
FIG. 1 is a simplified isometric illustration of a portion of a 3D printing system according to one example.

Referring now to FIG. 1 there is shown an illustration of a portion of a 3D printing system 100 according to one example. For clarity reasons not all the elements of the 3D printing system 100 are shown. For example, the illustrations shown herein do not show any specific build material solidification systems, although any suitable build material solidification systems may be used, such as fusing agent deposition and heating systems, binder agent deposition systems, laser sintering systems, and the like.

The system 100 comprises a build material supply module 102 from which a quantity of build material may be prepared to be spread across a build platform 104 by a horizontally movable build material spreader 108. The spreader 108 may, in one example, be mounted on a suitable carriage or gantry (not shown). The build platform 104 may be movable in the z-axis, as indicated by arrow 106, to enable it to be lowered by a small amount to enable each layer of build material to formed thereon. In the example shown the build material spreader 108 is a roller, although in other examples other suitable forms of spreader, such as a wiper blade, may be used. Build material is supplied to the supply module 102 from a build material store (not shown). In one example, as described later, the build material store may be located below the height of the supply module 102, although in other examples other configurations may be used.

The supply module 102 has a length that, in one example, is substantially the same as the length of the build platform 104. In other examples, however, the supply module 102 may be longer or shorter than the build platform 104.

The supply module 102 forms a generally open container in which build material may be deposited, or delivered, and from which build material may be moved to enable it be spread over the build platform 104. In FIG. 1, the foreground endplate of the supply module 102 is not shown so as to allow the internal structure of the supply module 102 to be visible. In the example shown the supply module 102 has a cross-section that defines an arc of circle. In the example shown the arc defines a portion of a circle that is greater than a semicircle. The top of the supply module 102 is about level with the top of the build platform 104, although the top of the build platform 104 will be lower than the top of the supply module when a layer of build material is spread thereover. In other examples, the design of the supply module 102 may have a different shape.

The supply module 102 further comprises a vane, or blade, 110 that is connected to, or forms part of, a spindle 112, that is rotatable about the axis 114. The rotation axis 114 of the vane 110 runs through the centre of the circle that the cross-sectional arc shape of the supply module 102 defines.

The vane 110 has an angular form, comprising a first section 110a immediately adjacent to the spindle 112, and a distal second section 110b. The first section 110a may be referred to as a build material return section, and the second section 110b may be referred to as a build material support section. The angle formed by the first and second sections 110a and 110b may be selected based on characteristics of a build material, or of multiple build materials, with which the printing system 100 is to be used, as described in further detail below. In one example, when the second section 110b is horizontal (in a 'feed position'), the first section 110a slopes towards the spindle 112 at an acute angle which in one example may be between about 20 to 45 degrees below horizontal, although in other examples greater or smaller angles may be selected. The length of the first and second sections 110a and 110b are chosen such that the free end of the section 110b forms a substantial seal against the curved inner surface of the supply module 102 as the vane 110 is rotated.

In one example the vane 110 is formed as a single object, for example through extrusion of a material, or through bending of a sheet of material. In this example, the first and second portions 110a and 110b of the vane are fixed relative to each other, and the angle between the first and second portions 110a and 110b is not adjustable. Such a vane has a mechanically simple design that has no moving parts, and that enables the vane mechanism to function in a powdered build material environment.

The vane 110 may be driven by any suitable drive mechanism (not shown), such as a stepper motor, rack and pinion arrangement, or the like and may additionally be coupled to a position determination module (not shown), such as an angular encoder, to enable the angular position of the vane to be accurately controlled and determined.

Figure 2A:
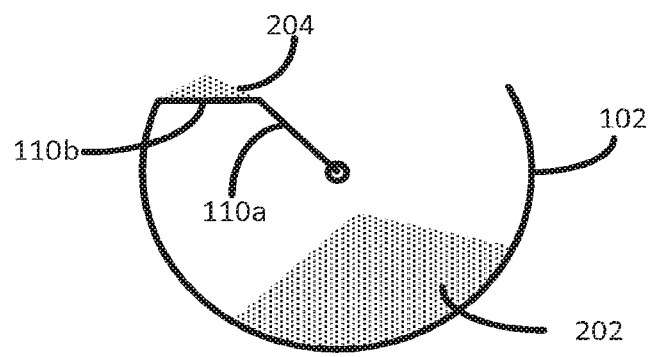
FIG. 2a is a simplified side view of a build material supply module according to one example.

Referring now to FIG. 2a, there is shown a schematic cross-section drawing of the supply module 102 and vane 110 according to an example. A quantity of build material 202 has been delivered to the supply module 102 and the vane 110 has been rotated through the build material 202 in a clock-wise direction, such that the second section 110b of the vane is in a horizontal feed position. In this position the second section 110b is level with the top of the supply module 102. Due to the shape of the vane, as a volume of build material 204 is scooped up by the rotating vane 110 the volume of build material is constrained at the distal end of the second section 110b of the vane against the internal side wall of the supply module 102. As the second section 110b of the vane approaches the horizontal position the build material supported by the second section 110b of the vane starts to stabilize at its natural angle of repose, and excess build material starts to fall away under gravity, sliding down the first portion 110a of the vane and back into the supply module 102. Since the excess build material slides down the first portion 110a it has a slower speed than if it were to freefall under gravity.

Once the second section 110b of the vane is horizontal and the excess build material has fallen back into the supply module 202, the volume of build material 204 supported by the second section 110b of the vane is a substantially predetermined volume. The predetermined volume may be modified, for a build material having a given angle of repose, by modifying the depth of the second section 110b of the vane. Using a build material having a different angle of repose will also modify the predetermined quantity. Depending on the volume of build material used by the 3D printer 100 whilst processing each layer the parameters of the vane 110 may be chosen accordingly.

The first section 110a of the vane plays an important role in returning excess powder back to the build module 202 whilst reducing the amount of build material that may become airborne. This is because once build material becomes airborne it can cause problems that may include, for example: obscuring visual sensors; contamination of printheads used to deposit agents on the build material; causing an explosion risk; and environmental issues. Accordingly, by choosing a gentle slope of, for example, less than 45 degrees, or less than 30 degrees, or less than 20 degrees, reduces the speed at which excess build material is returned to the supply module, and hence reduces the amount of build material that becomes airborne. The angle formed by the first section 110a of the vane when the second section 110b of the vane is horizontal may be chosen based on, for example, the angle of repose of the build material used or other characteristics of the build material.

In some examples the first portion 110a of the vane may continue beyond the spindle 112, such that the distance any build material may free-fall back into the supply module 102 may be further reduced to even further reduce the amount of build material may become airborne. In this example the axis of rotation of the vane 110 may be within the build material return section 110a.

Figure 2B:
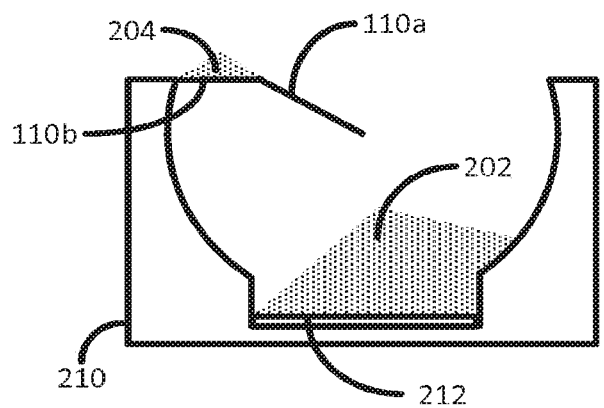
FIG. 2b is a simplified side view of a build material supply module according to one example.

FIG. 2b shows a further example of a supply module 210. In this example the supply module 210 comprises a reciprocating build material distribution element 212. The build material distribution element 212 may be controlled to reciprocate, or slide, along the base of the supply module 210, by a small amount to help distribute build material within the supply module 210, as described further below. In one example the build material distribution element 212 may be controlled to slide, or vibrate, by up to about 1 cm, although in other examples the build material distribution element may be controlled to slide by a greater or smaller amount. In one example the build material distribution element may comprise a mesh-like structure and be driven by any suitable drive system, such as a motor.

In other examples a build material distribution element, such as build material distribution element 212 may be incorporated into the supply module 102 in a suitable manner.

Figure 3:
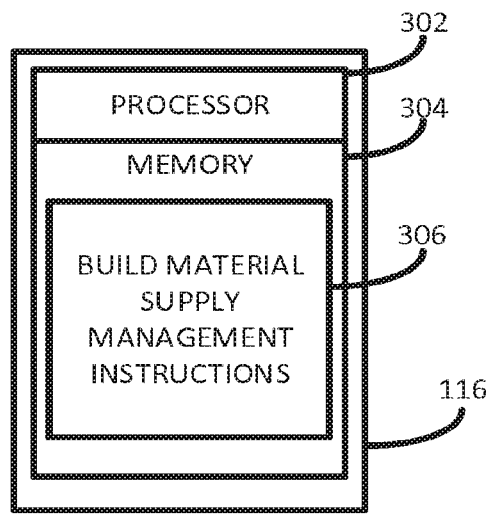
FIG. 3 is a block diagram of a controller.

Operation of the 3D printing system 100 is generally controlled by a controller 116, as shown in greater detail in FIG. 3.

The controller 116 comprises a processor 302 coupled to a memory 304. The memory 304 stores build material supply management instructions 306 that, when executed by the processor 302, control the 3D printing system 100 to manage the supply of build material, as described herein.

Figure 4:
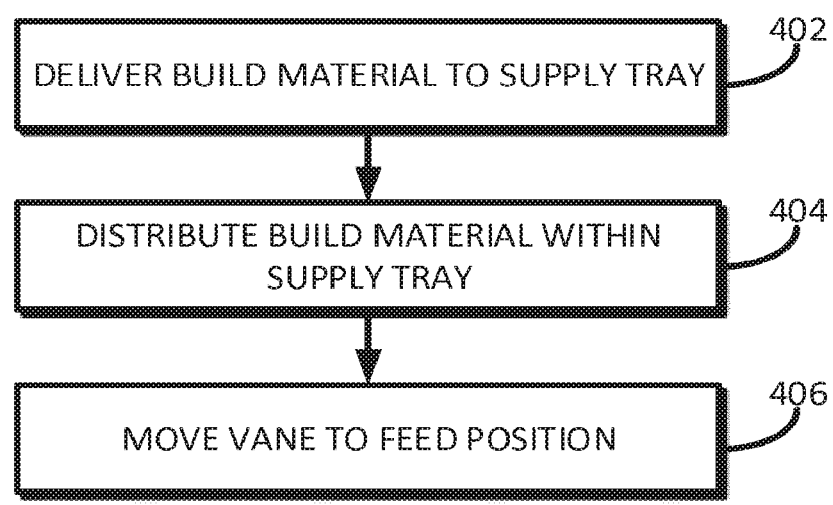
FIG. 4 is a flow diagram outlining an example method according to one example.
Figure 5:
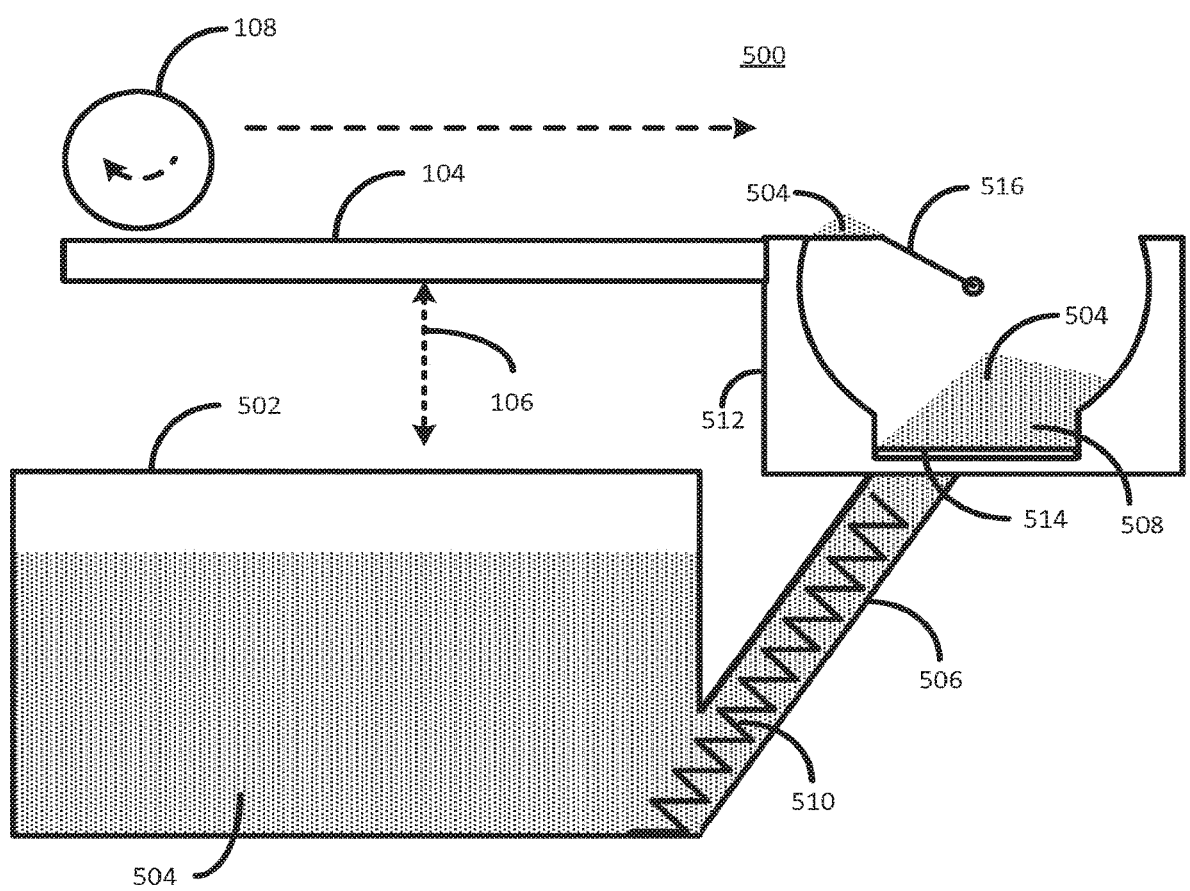
FIG. 5 is a simplified side view illustration of a 3D printing system according to one example.

Example operation of the 3D printing system 100 will now be described with reference to the flow diagram of FIG. 4 and the drawing of FIG. 5.

At 402, the controller 116 controls the delivery of build material to the supply module 102. One example of how build material may be delivered to the supply module 102 is shown in FIG. 5. In FIG. 5 is shown a build material store 502 comprising build material 504 and a feed channel 506 to move build material 504 from the build material store 502 to a delivery zone 508 within the supply module 512. The feed channel 506 comprises a feed mechanism, such as an auger screw 510, or any other suitable feed mechanism.

In one example the build material feed mechanism 510 may be controlled to deliver a predetermined amount of build material to the supply module 102. For example, if an auger screw mechanism is used as the feed mechanism, the number of rotations of the auger screw may be controlled to deliver the predetermined amount of powder.

The delivery zone 508 may be positioned at any suitable position along the length of the supply module 512, but in at least some examples the delivery zone 508 does not extend substantially along the length of the supply module. For example, the delivery zone may have a length that is less than about 10% of the length of the supply module 512 in some examples.

The build material store 502 may, in one example, additionally include a vibrator or compactor (not shown) to help ensure that build material 504 within the build material store 502 compacts around the lower end of the feed mechanism 510, to ensure a regular supply of build material to the feed mechanism 510.

Having a build material store located generally beneath the build platform 104 and supply module 102 enables the footprint of such a 3D printing system to be reduced, compared to having a build material store located at one side of the 3D printing system.

In other examples, however, build material may be delivered to the supply module 102 using other suitable configurations such as, for example, from an overhead build material hopper.

At 404, the controller 116 controls a build material distribution element 514 to reciprocate to evenly distribute the delivered build material 504 along the length of the supply module 512. In one example, as build material is being delivered to the supply module 512, the controller 116 moves the vane 516 to a position, such as a generally vertical position. This allows the build material 508 to be distributed to a generally even level on both sides of the vane 516. In other examples the controller 116 may reciprocate the vane 516 to help the even distribution of build material within the supply module 102.

At 406, the controller 116 controls the vane 516 to move to the feed position, i.e., such that the second portion of the vane is horizontal. As described above, as the vane 516 moves to the horizontal position excess build material may slide down the first portion of the vane 516 and be returned to the supply module 512. Depending on the nature of the build material, by the time the vane 516 is moved to the feed position the quantity of build material supported by the second portion of the vane 516 will have stabilized, leaving a predetermined quantity of build material ready to be spread across the build platform 104. In one example, however, a short delay, for example less than 1 second, may be introduced to allow build material supported by the second portion of the vane 516 to stabilize before the build material is spread across the build platform 104.

Figure 6:
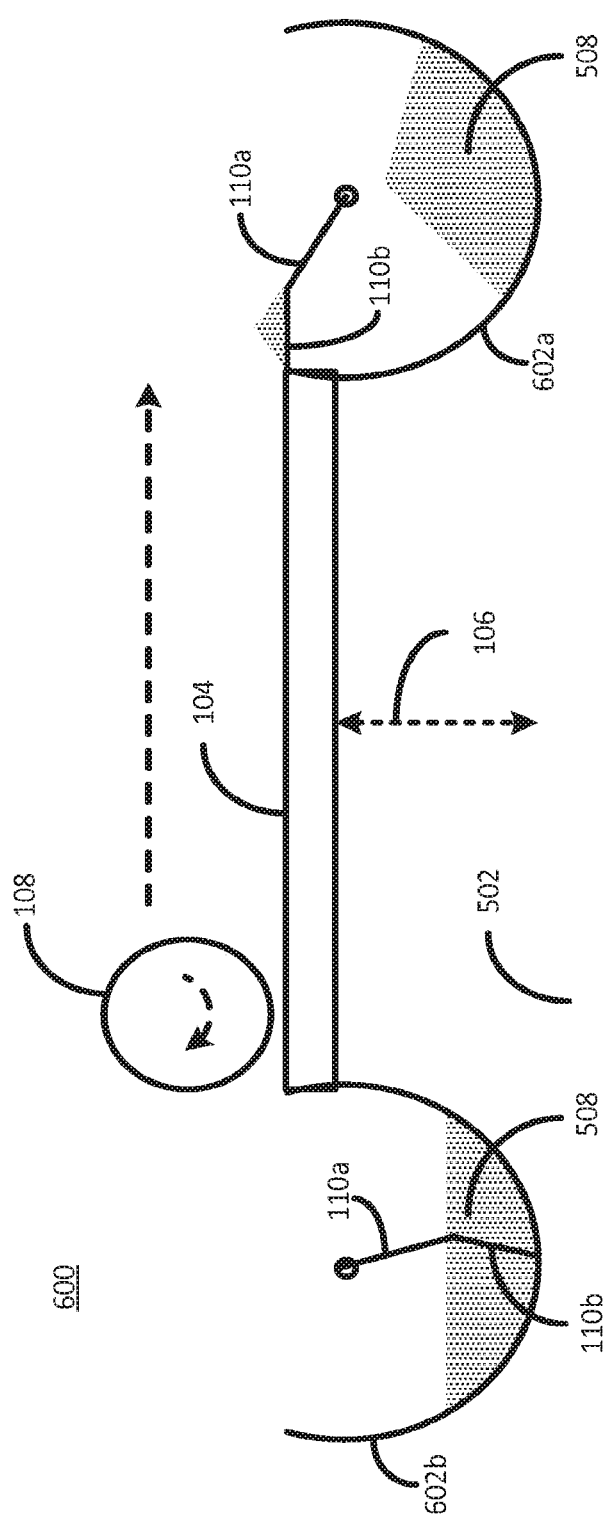
FIG. 6 is a simplified side view illustration of a 3D printing system according to one example.

A yet further example is illustrated in FIG. 6, which shows a cross sectional illustration of a portion of a 3D printing system 600 according to one example. In this example a pair of supply modules 602a and 602b are provided on opposite sides of a build platform 104. This example enables build material to be supplied to either side of the build platform 104. Furthermore, any excess build material may be returned to the opposite supply module.

In this way, coordination of the control of each supply module 602a and 602b may provide enhanced efficiencies when the 3D printing system 600 is configured to operate in a bi-directional manner. By bi-directional is meant that a layer of build material may be formed on the build platform 104 by the build material spreader 108 using build material from either of the build modules 602a or 602b. The 3D printing system 600 may also be able to selectively solidify portions of a formed layer of build material whilst operating in either direction.

In one example the build platform 104 may be part of a removable build module that may be insertable into the 3D printing system. Accordingly, reference herein to a build platform will be understood to generally refer to when such a build module is inserted into the 3D printing system.

Although examples of the vane described herein describe a vane having an angular form, in other examples the vane may comprise other forms, such as comprising one or multiple curved portions. For example, the build material return portion may, in some examples, have a curved formed.

It will be appreciated that examples described herein can be realized in the form of hardware, software or a combination of hardware and software. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape. It will be appreciated that the storage devices and storage media are examples of machine-readable storage that are suitable for storing a program or programs that, when executed, implement examples described herein. Accordingly, some examples provide a program comprising code for implementing a system or method as claimed in any preceding claim and a machine readable storage storing such a program. Still further, some examples may be conveyed electronically via any medium such as a communication signal carried over a wired or wireless connection.

All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings), may be replaced by alternative features serving the same, equivalent or similar purpose, unless expressly stated otherwise. Thus, unless expressly stated otherwise, each feature disclosed is one example only of a generic series of equivalent or similar features.

What is claimed is:

1. A system for supplying build material for three-dimensional printing, comprising:
    a build material supply module; and
    a rotatable vane to move a portion of build material from the build material supply module to a feed position, the vane comprising a build material support section and a build material return section,
    the vane arranged having a common and continuous surface that extends over the build material support section and build material return section such that, as the build material support section is moved to the feed position, excess build material may slide down from the build material support section on the common surface to the build material return section and return to an interior of the build material supply module, thereby leaving a predeterminable quantity of build material on the build material support section, wherein the build material return section extends from an axis of rotation of the vane to the build material support section.

2. The system of claim 1, wherein an axis of rotation of the vane is a central axis of a cylindrically-shaped chamber within the build material supply module.

3. The system of claim 1, wherein the feed position is where the build material support section is horizontal.

4. The system of claim 1, further comprising a build material spreader to spread build material from the vane, when in the feed position, over a build platform.

5. The system of claim 4, wherein the spreader is to delay operation for a period of time after the build material support section arrives in the feed position so as to allow for stabilization of the build material prior to spreading.

6. The system of claim 1, further comprising:
a build material delivery system;
a build material distribution system;
a build material spreader; and
a controller to:
control the build material delivery system to deliver build material to the build material supply module;
control the build material distribution system to distribute build material within the build material supply module; and
control the rotatable vane within the build material supply module to move a portion of build material from the build material supply module to a horizontal feed position,
such that, as the vane is rotated to position the build material support section horizontally, the build material return section slopes back into an interior of the build material supply module from an edge of the build material support section that is opposite another edge of the build material support section that is then adjacent a build platform so that excess build material may slide down the build material return section to return to the build material supply module and cause the predeterminable quantity of build material to be left on the build material support section.

7. The system of claim 6, wherein a distal end of the vane forms a seal against an inside of the supply module.

8. The system of claim 6, wherein the build material delivery system delivers build material to a delivery zone within the supply module, the delivery zone have a length less than the length of the supply module, and wherein the controller controls the build material distribution system to evenly distribute the build material along the length of the supply module.

9. The system of claim 6, wherein a quantity of build material left on the build material support section when in the feed position is based in part on a depth of the build material support section, and in part on characteristics of the build material.

10. The system of claim 6, wherein an axis of rotation of the vane is a central axis of a cylindrically-shaped chamber within the build material supply module.

11. The system of claim 6, further comprising a build material store located below the build material supply module, and wherein the build material delivery system is to deliver build material from the build material store to the build material supply module in a delivery zone within the build material supply module.

12. The system of claim 6, wherein the build material distribution system comprises a reciprocating member disposed on a bottom of the build material supply module, wherein the reciprocating member is to reciprocate along the bottom of the supply module.

13. The system of claim 6, wherein an angle between the build material support section of the vane and the build material return section of the vane corresponds to a characteristic of the build material to be delivered.

14. The system of claim 6, wherein the build material delivery system comprises an auger screw to deliver controlled amounts of build material to the build material supply module.

15. The system of claim 6, wherein the build material spreader is to delay spreading of the build material for a period of time after the build material support section arrives in the feed position so as to allow for stabilization of the build material prior to spreading.

16. A system for supplying build material for three-dimensional printing, comprising:
a build material supply module; and
a rotatable vane to move a portion of build material from the build material supply module to a feed position, the vane comprising a build material support section and a build material return section,
the vane arranged having a common and continuous surface that extends over the build material support section and build material return section such that, as the build material support section is moved to the feed position, excess build material may slide down from the build material support section on the common surface to the build material return section and return to an interior of the build material supply module, thereby leaving a predeterminable quantity of build material on the build material support section;
wherein the angle between the build material support section and the build material return section is between about 20 and 45 degrees.

17. A method of providing a predeterminable volume of build material for spreading over a build platform of a three-dimension printing system, comprising:
delivering build material to a build material supply module and distributing the build material evenly therein; and
rotating a vane about an axis of rotation so that a first distal portion of the vane travels through build material in the supply module and then to a feed position,
wherein at the feed position, the first distal portion of the vane is horizontal, and a second portion of the vane slopes back into an interior of the build material supply module from an edge of the first distal portion that is opposite another edge of the first distal portion adjacent the build platform;
the vane arranged having a continuous surface that extends over the first distal portion and the second portion such that, as the first distal portion is moved to the feed position, excess build material may slide down from the first distal portion on the common surface to the second portion section and return to an interior of the build material supply module, thereby leaving a predetermined quantity of build material on the first distal portion, wherein the second portion section extends from the first distal portion to the axis of rotation of the vane.

18. The method of claim 17, wherein an angle between first distal portion and the second distal portion of the vane is between 20 and 45 degrees and corresponds to a characteristic of the build material to be delivered.

19. The method of claim 17, further comprising delaying spreading of the build material for a period of time after the first distal portion arrives in the feed position so as to allow for stabilization of the build material prior to spreading.

* * * * *